(12) United States Patent
Fung

(10) Patent No.: US 10,751,897 B2
(45) Date of Patent: Aug. 25, 2020

(54) SPIRALIZER MIXER ATTACHMENT

(71) Applicant: Conair Corporation, Stamford, CT (US)

(72) Inventor: Kam Fai Fung, Tuen Mun (HK)

(73) Assignee: CONAIR CORPORATION, Stamford, CT (US)

( * ) Notice: Subject to any disclaimer, the term of this patent is extended or adjusted under 35 U.S.C. 154(b) by 159 days.

(21) Appl. No.: 15/806,998

(22) Filed: Nov. 8, 2017

(65) Prior Publication Data

US 2019/0134835 A1    May 9, 2019

(51) Int. Cl.
| | |
|---|---|
| *B26D 3/11* | (2006.01) |
| *A47J 43/07* | (2006.01) |
| *B26D 1/00* | (2006.01) |
| *B26D 7/26* | (2006.01) |
| *B26D 7/06* | (2006.01) |
| *B26D 1/43* | (2006.01) |

(52) U.S. Cl.
CPC ............ *B26D 3/11* (2013.01); *A47J 43/0711* (2013.01); *B26D 1/0006* (2013.01); *B26D 1/43* (2013.01); *B26D 7/0641* (2013.01); *B26D 7/2614* (2013.01); *B26D 2001/006* (2013.01); *B26D 2210/02* (2013.01)

(58) Field of Classification Search
CPC ...... B26D 3/11; B26D 7/0641; B26D 1/0006; B26D 1/43; B26D 7/2614; B26D 7/2628; B26D 2001/006; B26D 2210/02; A47J 43/0711; A47J 43/08; A47J 43/082; A47J 43/0772; A47J 43/0783; A47J 43/0788; A47J 43/0777; A47J 43/0794; A47J 43/075; A47J 43/0755; A47J 43/0761; A47J 43/046; A47J 43/07; A47J 43/085; A47J 43/055; A47J 43/0722; Y10S 83/932
USPC ............................................................ 83/932
See application file for complete search history.

(56) References Cited

U.S. PATENT DOCUMENTS

| | | | | |
|---|---|---|---|---|
| 3,528,469 | A | * | 9/1970 | Mantelet ............ A47J 43/0772 241/199.12 |
| 3,892,365 | A | * | 7/1975 | Verdun .................. A47J 43/06 241/92 |
| 4,113,188 | A | * | 9/1978 | Belinkoff ............... A47J 43/06 241/282.1 |
| 4,691,870 | A | * | 9/1987 | Fukunaga ............. A47J 43/046 241/282.2 |
| 4,856,718 | A | | 8/1989 | Gaber et al. |

(Continued)

FOREIGN PATENT DOCUMENTS

| | | | |
|---|---|---|---|
| CN | 105816071 | * | 8/2016 |
| CN | 105816071 A | | 8/2016 |

(Continued)

OTHER PUBLICATIONS

International Search Report dated Jan. 11, 2019 for PCT Application No. PCT/US2018/059569.

*Primary Examiner* — Evan H MacFarlane
(74) *Attorney, Agent, or Firm* — McCormick, Paulding & Huber PLLC

(57) ABSTRACT

A spiralizer attachment for a stand mixer includes a base assembly connectable to an attachment drive port of the stand mixer and a cutting blade rotatably disposed in the base assembly. The spiralizer attachment further includes a lid including a feeding chute through which food can be delivered to the cutting blade.

14 Claims, 17 Drawing Sheets

(56) References Cited

U.S. PATENT DOCUMENTS

| | | | |
|---|---|---|---|
| 5,445,070 A | | 8/1995 | Rebel |
| 5,836,528 A | | 11/1998 | Hilgarth |
| 7,740,400 B2 | | 6/2010 | Membreno |
| D682,606 S | | 5/2013 | Machovina et al. |
| 8,550,390 B2 | | 10/2013 | Machovina et al. |
| 8,925,845 B2 | | 1/2015 | Machovina et al. |
| 8,939,390 B2 | | 1/2015 | Machovina et al. |
| 8,973,855 B2 | | 3/2015 | Machovina et al. |
| D739,678 S | | 9/2015 | Benoit et al. |
| D739,679 S | | 9/2015 | Benoit et al. |
| 9,167,938 B2 | | 10/2015 | Benoit et al. |
| 9,556,916 B2 | | 1/2017 | Conti et al. |
| 9,675,101 B2 | | 6/2017 | Conti et al. |
| D848,214 S | * | 5/2019 | Fung .............................. D7/412 |
| 2008/0217446 A1 | * | 9/2008 | Clapp ................. A47J 43/0772 |
| | | | 241/37.5 |
| 2016/0143484 A1 | | 5/2016 | Palmer et al. |
| 2016/0249772 A1 | | 9/2016 | Jays et al. |
| 2016/0345779 A1 | | 12/2016 | Tu |
| 2017/0057110 A1 | * | 3/2017 | Guo ....................... B26D 5/086 |
| 2017/0135526 A1 | * | 5/2017 | Conti .................... A47J 19/027 |

FOREIGN PATENT DOCUMENTS

| | | | |
|---|---|---|---|
| CN | 206123767 | * | 4/2017 |
| CN | 206123767 U | | 4/2017 |
| CN | 206586856 U | | 10/2017 |
| GB | 2305598 A | | 4/1997 |
| GB | 2553854 | * | 3/2018 |

\* cited by examiner

SPIRALIZER MIXER ATTACHMENT

TECHNICAL FIELD

This present disclosure relates to attachments for stand mixers.

BACKGROUND

A stand mixer may include an accessory drive port in addition to its traditional mixer drive. The accessory drive port allows an accessory attachment, such as a meat grinder attachment, a pasta extruder attachment or a pasta roller attachment, to be coupled to and powered by the stand mixer motor to provide additional functionality to the stand mixer.

SUMMARY

According to the present disclosure, a spiralizer attachment for a stand mixer comprises a base assembly connectable to an attachment drive port of the stand mixer and a cutting blade rotatably disposed in the base assembly. The spiralizer attachment further comprises a lid including a feeding chute through which food can be delivered to the cutting blade.

The feeding chute may extend vertically outward from a disc portion of the lid or may extend outwardly from the disc portion of the lid at a tilted angle. The cutting blade may be provided on a blade disc having an inverted cone-shaped body and the feeding chute may extend outward from the disc portion of the lid at an angle that is substantially perpendicular to a wall of the inverted cone-shaped body of the blade disc.

According to the present disclosure, the spiralizer attachment may comprise a drive system adapted to drive the cutting blade in rotary motion within the base assembly, and an actuation assembly configured to connect and disconnect the cutting blade from the drive system when the lid is attached to and detached from the base assembly, respectively.

According to the present disclosure, the drive system may comprise a drive shaft connectable to the attachment drive port of the stand mixer, a first gear coupled to the drive shaft, and a blade holder supporting the cutting blade and rotationally coupled thereto. The blade holder may comprise a ring gear formed in an outer surface thereof. The actuation assembly may be configured to bring the ring gear into and out of contact with the first gear coupled to the drive shaft. The first gear may be a conical gear, and the ring gear may be formed in the outer surface of the blade holder as a conical gear ring.

According to the present disclosure, the lid may comprise a plurality of sliding blocks receivable in corresponding chutes formed in the base assembly to couple the lid thereto. The lid may further comprise at least one activation coupling tab adapted to engage the actuation assembly and cause actuation thereof when the lid is coupled and decoupled from the base assembly.

According to the present disclosure, the actuation assembly may comprise a lift assembly slidably disposed within the base assembly, and a rotational ring slidably coupled to an upper end of the lift assembly such that rotation of the rotational ring causes lifting or lowering of the lift assembly within the base assembly. The rotational ring may comprise a lid coupling slot configured to receive the activation coupling tab of the lid. The lift assembly may include an anti-rotation feature engaging a corresponding feature on the base assembly to prevent rotation of the lift assembly relative to the base assembly. The lift assembly may also include a shelf supporting the blade holder thereon.

According to the present disclosure, rotation of the lid relative to the base assembly may drive rotation of the rotational ring and lifting or lowering of the lift assembly and the blade holder to bring the ring gear into and out of contact with the first gear coupled to the drive shaft.

According to the present disclosure, the base assembly may comprise a lock that only allows rotation of the rotational ring when the activation coupling tab of the lid is received in the lid coupling slot. For example, the lock may comprise a lock bar biased into the lid coupling slot and displaceable therefrom by the activation coupling tab.

According to the present disclosure, a spiralizer attachment for a stand mixer may comprise a base assembly having a drive shaft connectable to an attachment drive port of the stand mixer. The base assembly may comprise a drive system coupling a blade holder to the drive shaft to drive the blade holder in rotary motion. The spiralizer attachment may further comprise a plurality of interchangeable blade discs. Each blade disc of the plurality of interchangeable blade discs may be receivable in the blade holder and may include a different style cutting blade. The spiralizer attachment may also comprise a lid connectable to the base assembly. The lid may include a feeding chute through which food can be delivered to the cutting blade of a blade disc disposed in the blade holder. The spiralizer attachment may yet further comprise a pusher slidably receivable in the feeding chute.

According to the present disclosure, the lid may comprise a plurality of sliding blocks receivable in corresponding chutes formed in the base assembly to couple the lid thereto. The lid may also comprise a plurality of pins configured to contact an upper surface of the blade disc when the lid is secured to the base assembly. The feeding chute may extend vertically outward from a disc portion of the lid or may extend outwardly from the disc portion of the lid at a tilted angle.

According to the present disclosure, a spiralizer attachment for a stand mixer may comprise a base assembly including a drive shaft connectable to an attachment drive port of the stand mixer and a drive system coupling a blade holder to the drive shaft to drive the blade holder in rotary motion. The spiralizer attachment may further comprise a plurality of interchangeable blade discs. Each blade disc may be receivable in the blade holder and may include a different style cutting blade. The spiralizer attachment may yet further comprise a plurality of lids connectable to the base assembly. Each lid may include a feeding chute through which food can be delivered to the cutting blade of a blade disc disposed in the blade holder. The plurality of lids may include a first lid having a feeding chute extending vertically outward from a disc portion of the lid, and a second lid having a feeding chute extending outwardly from a disc portion of the lid at an angle tilted relative to vertical.

These and other objects, features and advantages of the present disclosure will become apparent in light of the detailed description of embodiments thereof, as illustrated in the accompanying drawings.

DETAILED DESCRIPTION

Figure 1:
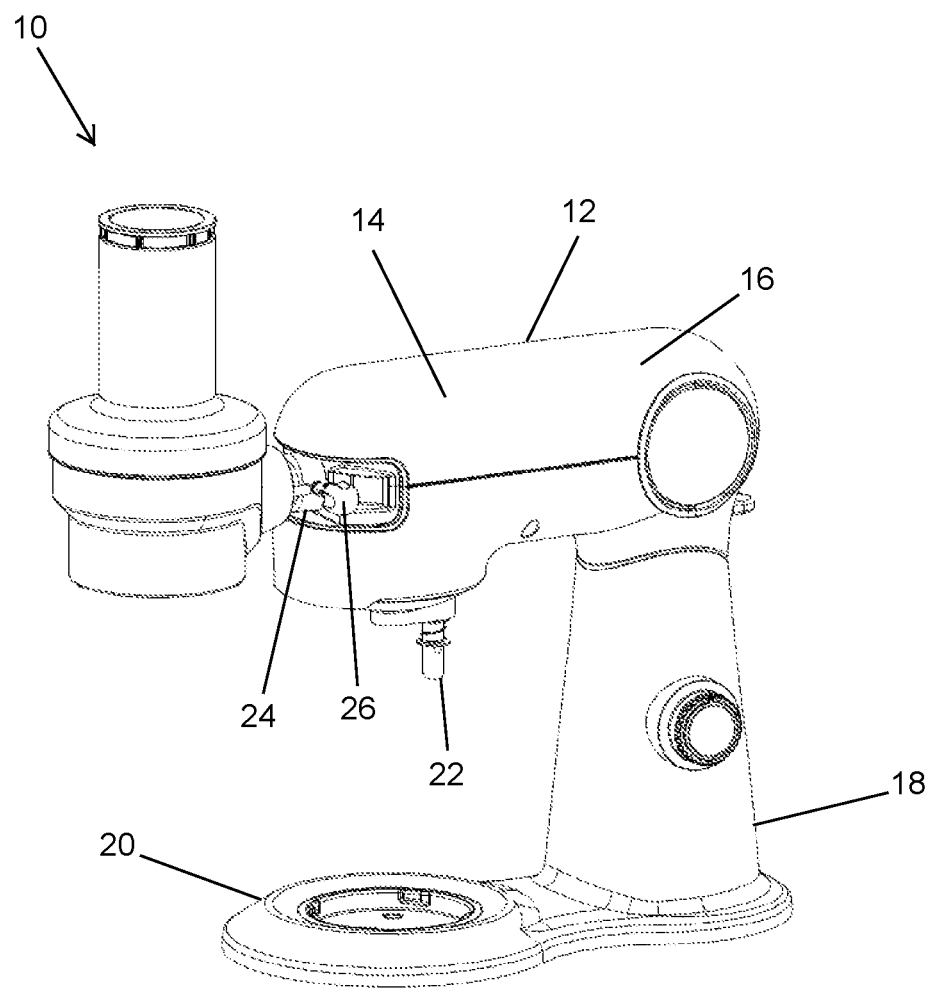
FIG. 1 is a front, top, left-hand side perspective view of a spiralizer attachment and stand mixer according to the present disclosure.

Before the various embodiments are described in further detail, it is to be understood that the invention is not limited to the particular embodiments described. It will be understood by one of ordinary skill in the art that the spiralizer attachment described herein may be adapted and modified as is appropriate for the application being addressed and that the components of the spiralizer attachment described herein may be employed in other suitable applications, and that such other additions and modifications will not depart from the scope thereof.

In the drawings, like reference numerals refer to like features of the apparatuses of the present application. Accordingly, although certain descriptions may refer only to certain figures and reference numerals, it should be understood that such descriptions might be equally applicable to like reference numerals in other figures.

Figure 2:
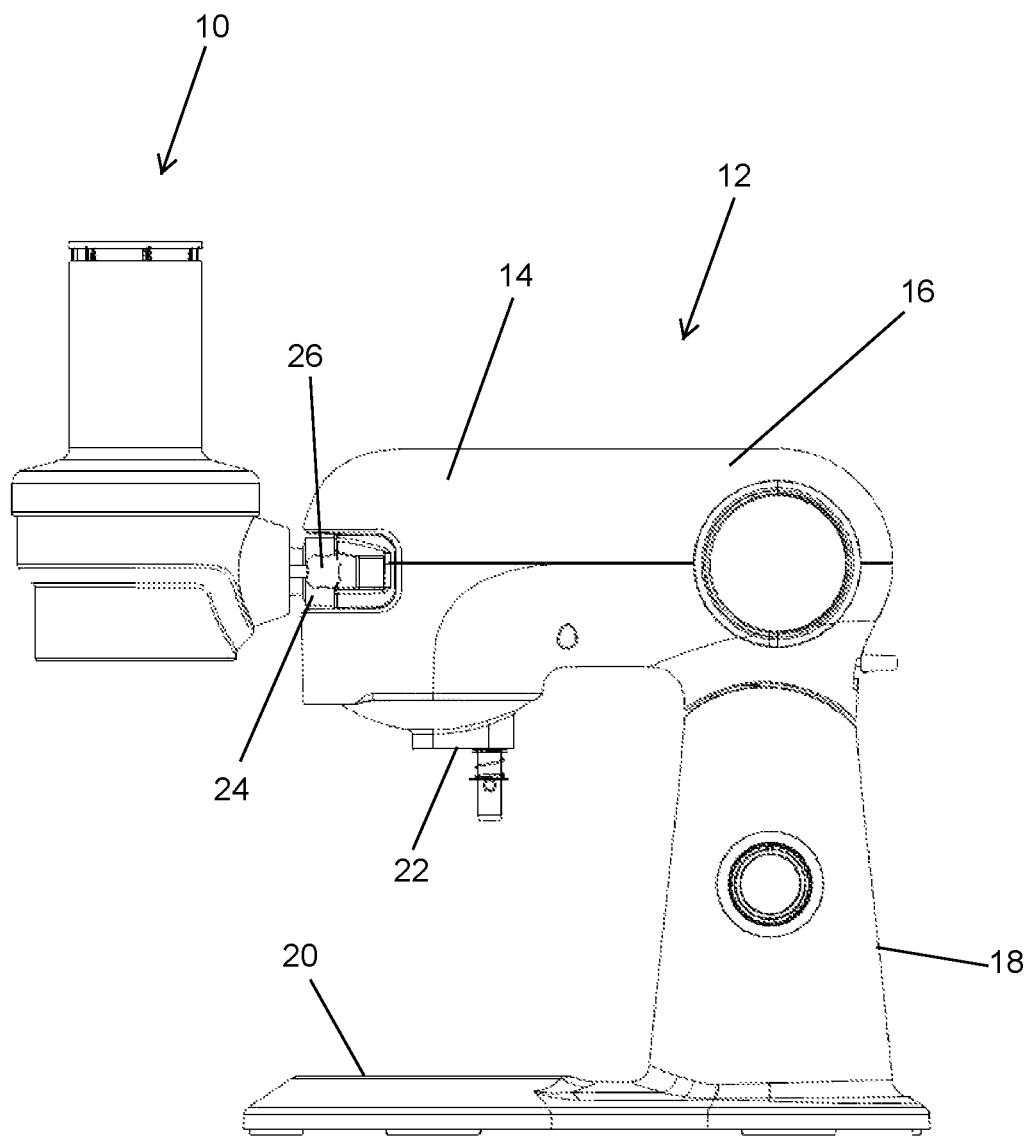
FIG. 2 is a front view of the spiralizer attachment and stand mixer of FIG. 1.

Referring to FIGS. 1 and 2, a spiralizer attachment 10 for use with a countertop stand mixer 12 is shown. The spiralizer attachment 10 is an assembly that cuts foods, such as raw vegetables, fruits, and the like, to form slices, shavings, julienne style ribbons, and/or other similar cut food portions. The stand mixer 12 includes an upper arm 14 having an external housing 16 that houses a mixer motor therein. The stand mixer 12 further includes a base portion 18 that is weighted to support upper arm 14, as well as the spiralizer attachment 10 when the spiralizer attachment 10 is coupled thereto. The base portion 18 may be formed in an L-shaped configuration with a bowl supporting portion 20 disposed directly below a mixing assembly 22 extending downward from an underside of the upper arm 14.

The stand mixer 12 includes a secondary attachment drive port 24 disposed on a front-most portion of the upper arm 14. The attachment drive port 24 includes a locking mechanism 26 adapted to lock attachments in place when mounted on the stand mixer 12. As noted above, the external housing 16 houses the mixer motor, which is adapted to power the mixing assembly 22 as well as a rotating drive outlet disposed within the attachment drive port 24. In this way, the mixer motor of the stand mixer 12 is adapted to power both mixing and attachment-based processes.

Figure 3:
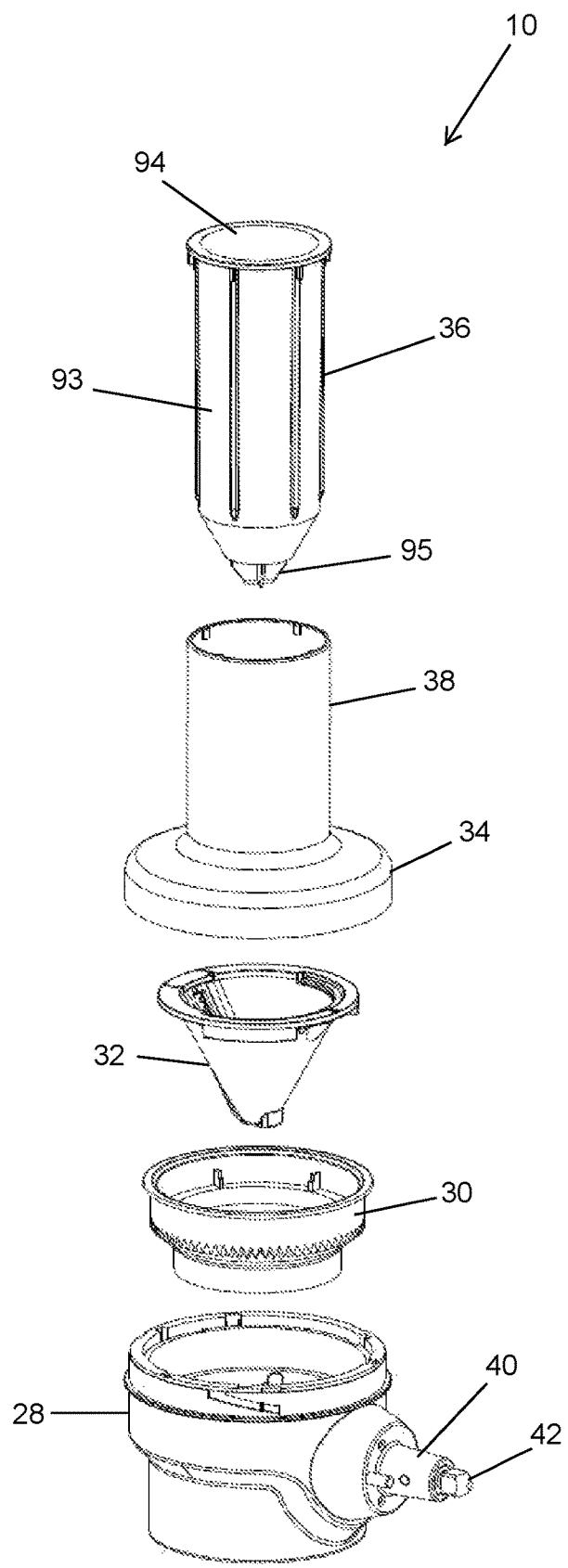
FIG. 3 is an exploded front, top, right-hand side perspective view of the spiralizer attachment of FIG. 1.
Figure 4:
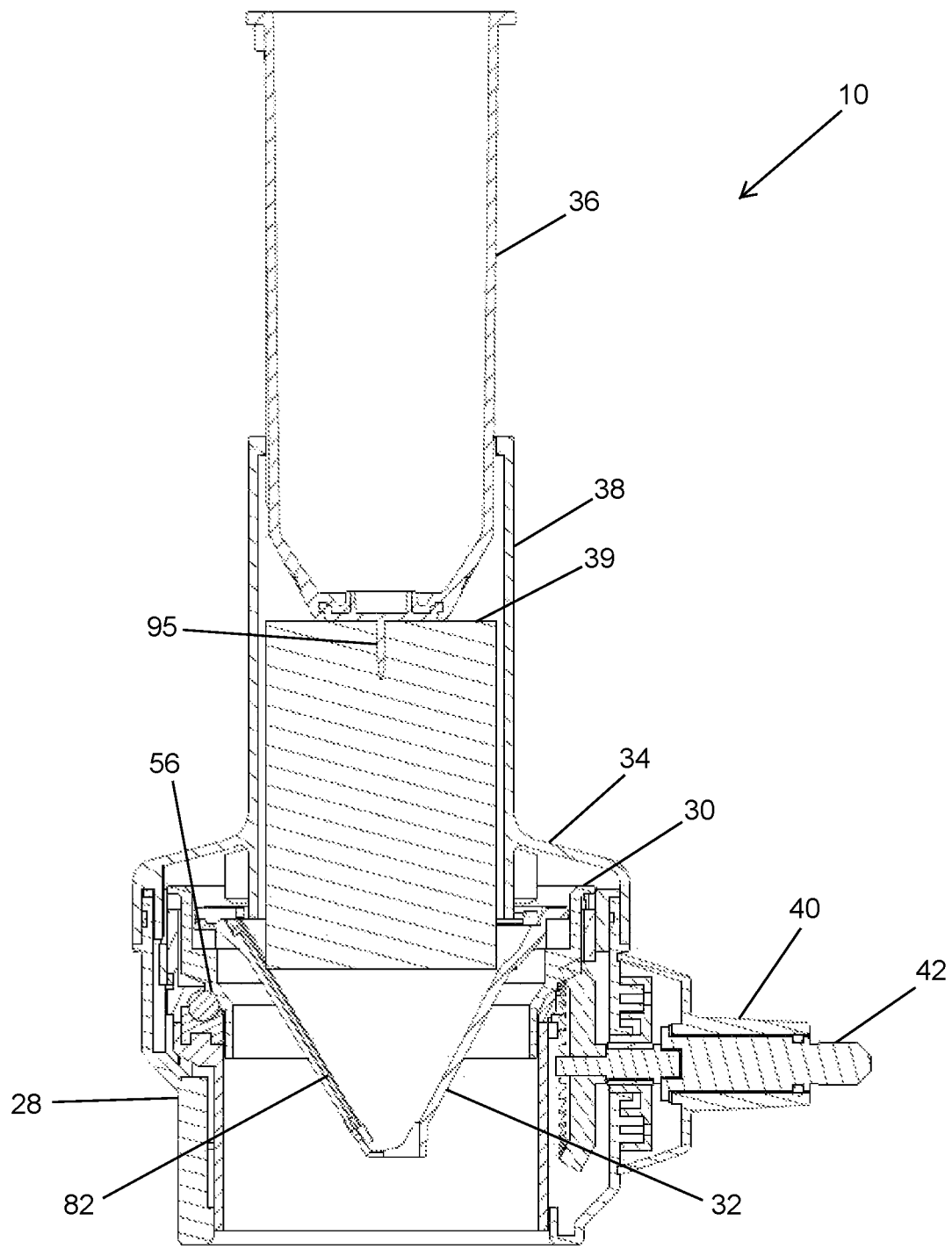
FIG. 4 is a front sectional view of the spiralizer attachment of FIG. 1.

Referring to FIGS. 3 and 4, the spiralizer attachment 10 includes a base assembly 28, a blade holder 30 configured to be received in the base assembly 28, and a blade disc 32 configured to be received in the blade holder 30. The spiralizer attachment 10 further includes a lid 34 that is detachably connectable to the base assembly 28 to secure the blade holder 30 and blade disc 32 within the base assembly 28, and a food pusher 36 adapted to slidably engage a feeding chute 38 of the lid 34 and feed food 39, shown in FIG. 4, into the blade disc 32.

The base assembly 28 includes a coupling hub 40 having a drive shaft 42 extending therefrom. The coupling hub 40 is adapted to engage the attachment drive port 24 of the stand mixer 12, shown in FIG. 1, to couple the spiralizer attachment 10 thereto. When the coupling hub 40 is engaged with the attachment drive port 24, shown in FIG. 1, the drive shaft 42 engages the rotating drive outlet of the attachment drive port 24, such that rotation of the drive shaft 42 may be powered by the mixer motor of the stand mixer 12, shown in FIG. 1.

Figure 5:
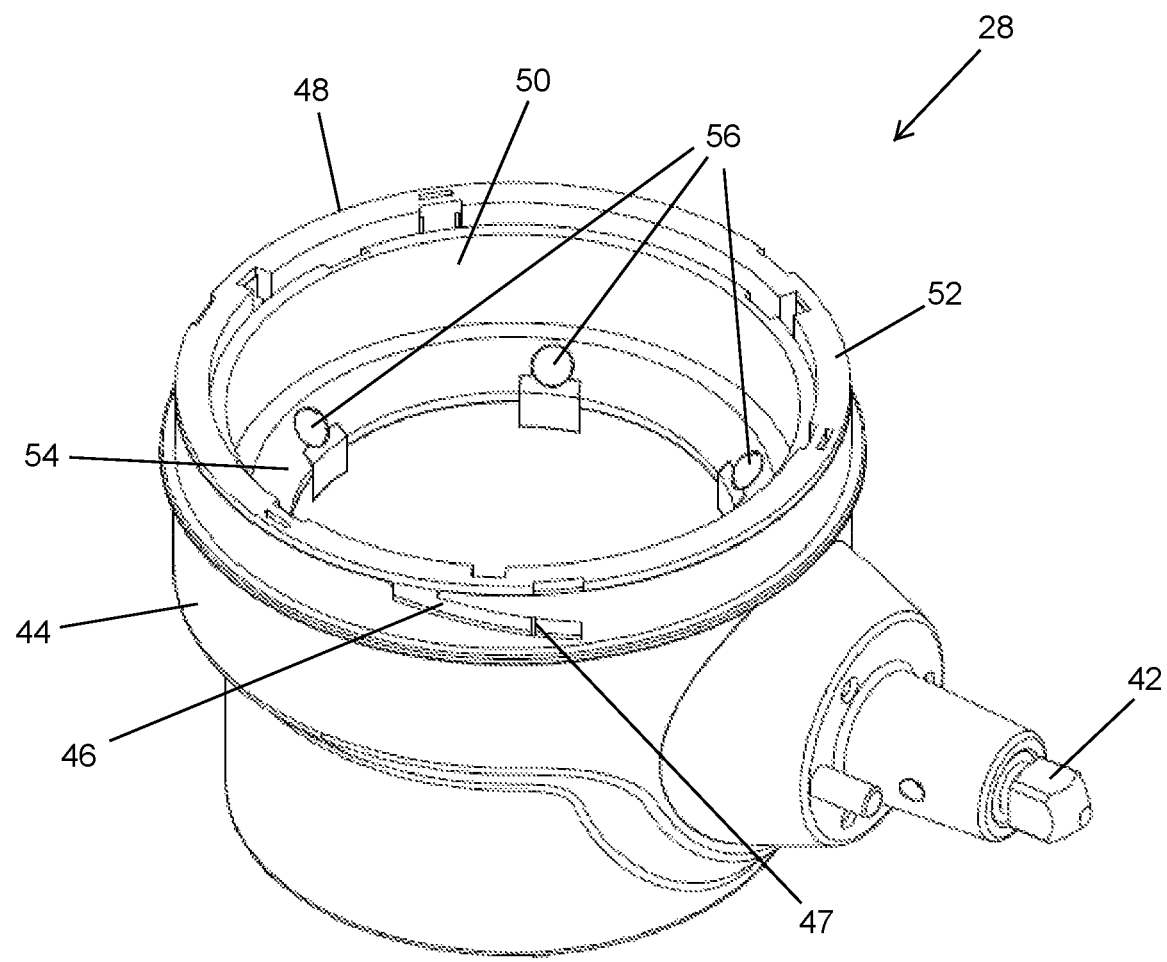
FIG. 5 is a front, top, right-hand side perspective view of a base assembly of the spiralizer attachment of FIG. 1.
Figure 6:
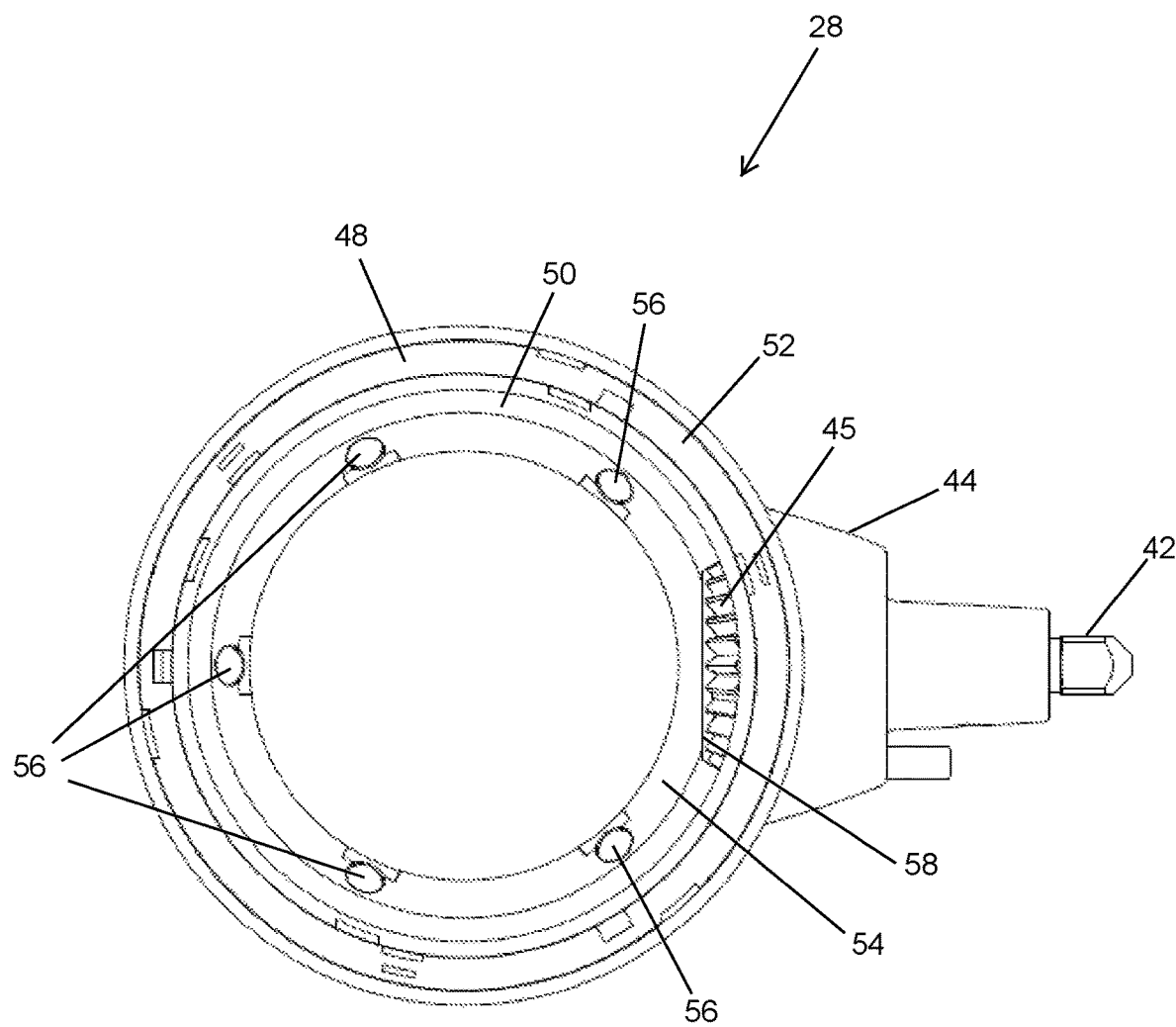
FIG. 6 is a top view of the base assembly of FIG. 5.

Referring to FIGS. 5 and 6, the base assembly 28 comprises a base housing 44. The drive shaft 42 extends into the base housing 44 and is coupled to a conical gear 45 disposed therein, such that rotation of the drive shaft 42 causes rotation of the conical gear 45 within the base housing 44. The base housing 44 includes chutes 46 formed in the outer surface thereof to facilitate attachment of the lid 34, shown in FIG. 3, to the base assembly 28. The chutes 46 extend downward from an upper end of the base housing 44 and transversely at a downward angle around a portion of the outer surface. The chutes 46 may include protrusions 47 formed therein that interact with the lid 34, shown in FIG. 3, to frictionally secure the lid 34 in a closed position. The base assembly 28 further includes an activation assembly 48 extending into the base housing 44 from the upper end thereof and defining a longitudinal passage extending through the base assembly 28 from the upper end to the lower end.

The activation assembly 48 includes a lift assembly 50 and a rotational ring 52 secured to the upper end of the lift assembly 50. The lift assembly 50 includes a support shelf 54 configured to support the blade holder 30, shown in FIG. 3, thereon and to allow the blade holder 30, shown in FIG. 3, to rotate about the longitudinal axis of the longitudinal passage. The support shelf 54 may include contact features to reduce frictional contact between the support shelf 54 and the blade holder 30, shown in FIG. 3. For example, as seen in FIGS. 4-6, the support shelf 54 includes a plurality of raised bearing balls 56 spaced apart along the circumference thereof to contact the blade holder 30, shown in FIG. 3, over a much lower surface area than the entire surface area of the support shelf 54. The bearing balls 56 may be formed of a low friction material such as stainless steel or the like.

An opening 58 is formed in the lift assembly 50 in the vicinity of the support shelf 54 to allow at least a portion of the conical gear 45 to extend into the longitudinal passage above the support shelf 54.

Figure 7:
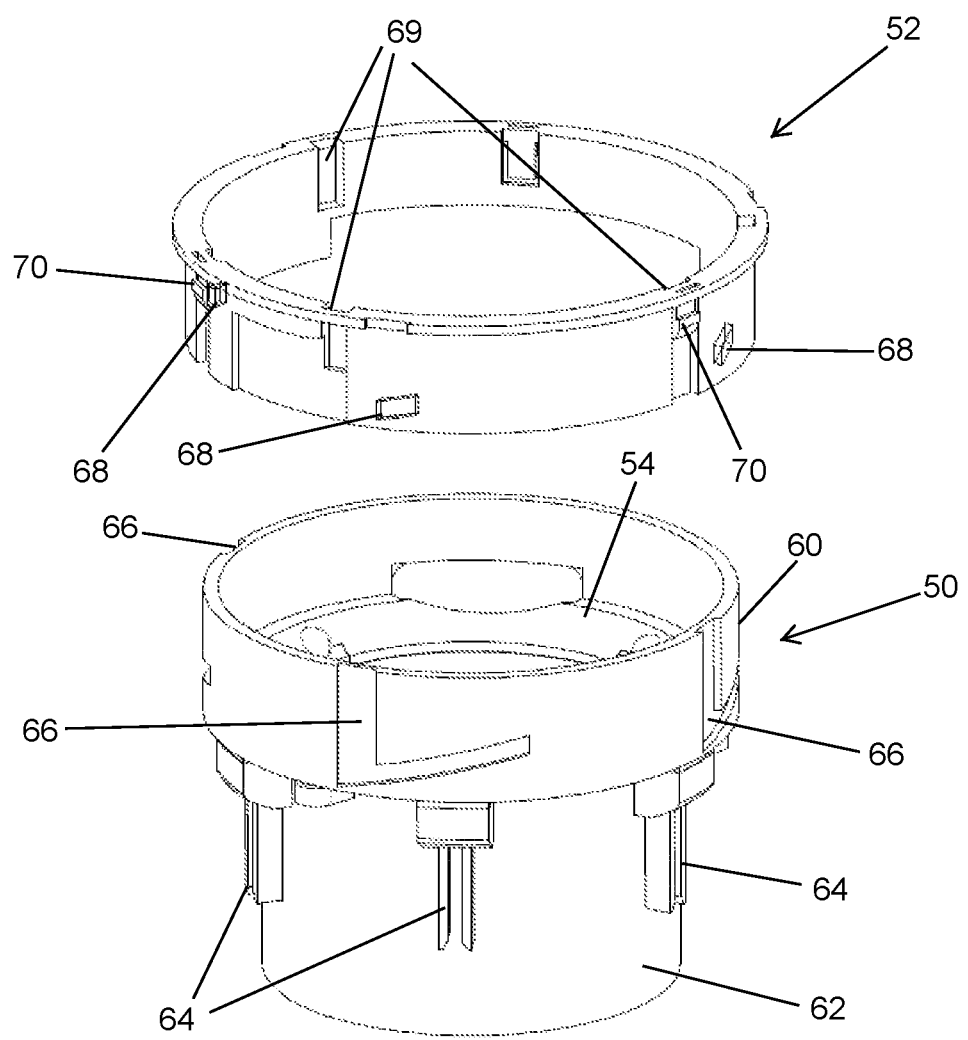
FIG. 7 is an exploded front, top, right-hand side perspective view of a actuation assembly of the base assembly of FIG. 5.

Referring to FIG. 7, the lift assembly 50 further includes an upper portion 60 above the support shelf 54 and a lower portion 62 below the support shelf 54, each of which may have a substantially cylindrical shape. The lower portion 62 includes one or more guides 64 formed on an outer surface thereof that engage corresponding guide features on the base housing 44, shown in FIG. 5, to prevent rotation of the lift assembly 50 relative to the base housing 44 while allowing the lift assembly to slide within the base housing 44 in the direction of the longitudinal axis. The upper portion 60 includes chutes 66 formed in the outer surface thereof to facilitate coupling of the rotational ring 52 to the lift assembly 50. The chutes 66 extend downward from an upper edge of the upper portion 60 and then extend transversely around a portion of the outer surface at an inclined angle back toward the upper edge.

The rotational ring 52 is formed with an inner surface sized to slidably engage the outer surface of the upper portion 60 of the lift assembly 50. The rotational ring 52 includes sliding blocks 68 formed on the inner surface thereof that are slidably received within the chutes 66 formed in the outer surface of the upper portion 60 of the lift assembly 50. The rotational ring 52 further comprises one or more lid coupling slots 69 configured to engage with one or more corresponding features formed on the lid 34, shown in FIG. 3, to rotationally couple the rotational ring 52 to the lid 34. The rotational ring 52 may also include one or more rotation limiting features configured to limit rotation of the rotational ring 52 relative the base housing 44, shown in FIG. 5, to a predetermined range. For example, the rotational ring 52 may include tabs 70 or the like formed in the outer surface thereof and configured to engage corresponding slots formed on an inner surface of the base housing 44, the slots allowing the tabs 70 to slide therein over the predetermined range.

Figure 8:
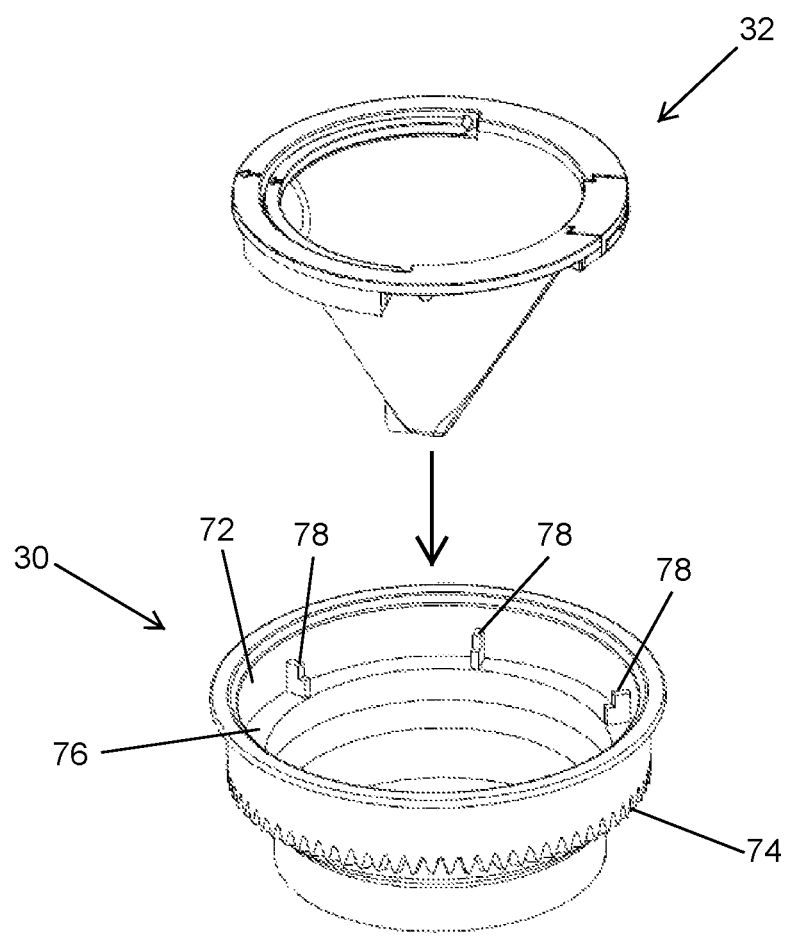
FIG. 8 is an exploded front, top, right-hand side perspective view of a blade holder and blade disc of the spiralizer attachment of FIG. 1.

Referring to FIG. 8, the blade holder 30 has a body forming a central passage 72 and includes a conical gear ring 74 formed in an outer surface of the body. The conical gear ring 74 may be brought into and out of interaction with the conical gear 45, shown in FIG. 6, to cause rotation of the blade holder 30. The central passage 72 is configured to receive the blade disc 32 therein and includes a blade disc support 76 formed therein. The blade disc support 76 includes a plurality of coupling walls 78 formed thereon and configured to rotationally couple the blade disc 32 to the blade holder 30 when the blade disc 32 is positioned within the blade holder 30.

Figure 10:
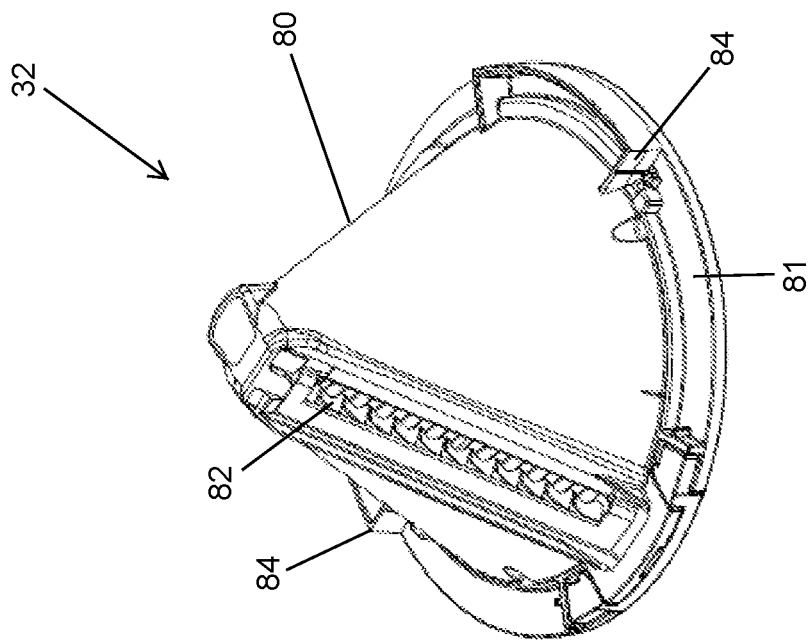
FIG. 10 is a front, bottom, left-hand side perspective view of the blade disc of FIG. 8.
Figure 9:
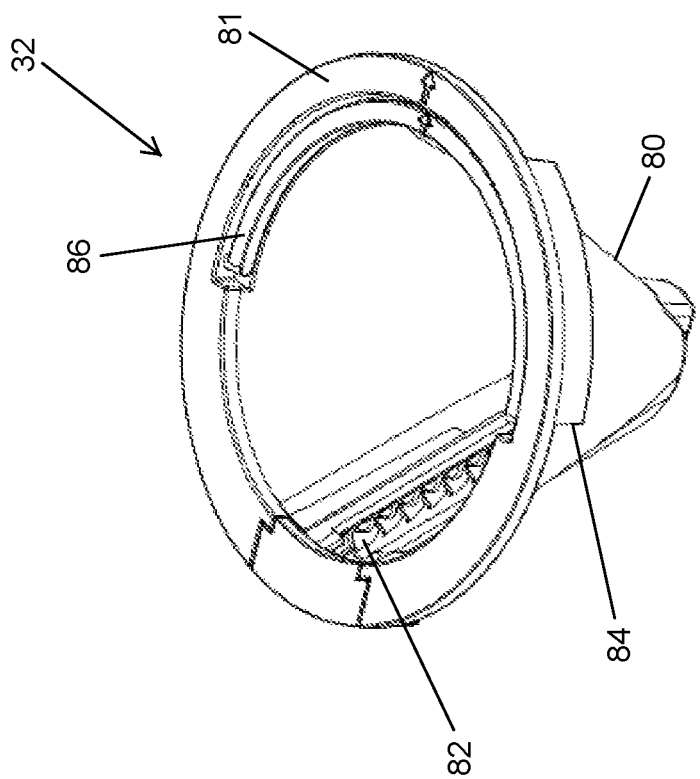
FIG. 9 is a front, top, right-hand side perspective view of the blade disc of FIG. 8.

Referring to FIGS. 9 and 10, the blade disc 32 has a generally inverted cone-shaped body 80 with a circular flange 81 formed at an upper end thereof. The blade disc 32 includes a blade 82 extending over substantially the entire length of the cone-shaped body 80. The blade 82 may include a cutting edge formed in a variety of configurations to cut food, such as raw vegetables, fruits, and the like, in a variety of styles including slices, shavings, julienne style ribbons, noodles and/or other similar cut food portions. The blade disc 32 further comprises rotational coupling walls 84 extending downward from an underside of the circular flange 81. The rotational coupling walls 84 are configured to engage the coupling walls 78 of the blade holder 30, shown in FIG. 8, when the blade disc 32 is positioned within the blade holder 30 to rotationally couple the blade disc 32 to the blade holder 30.

Figure 11:
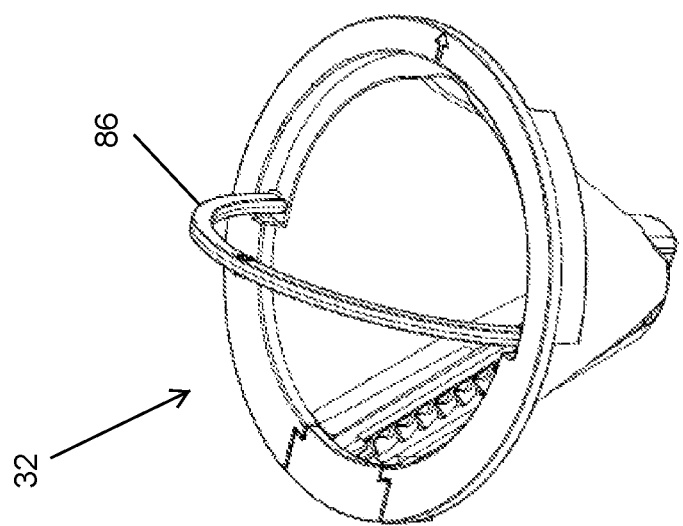
FIG. 11 is a front, top, right-hand side perspective view of the blade disc of FIG. 8.

The blade disc 32 may also include a handle 86 at the upper end thereof. The handle 86 may be rotationally coupled to the circular flange 81 so that the handle 86 may remain out of the way during operation of the spiralizer attachment 10, shown in FIG. 1, so as not to obstruct an opening into the inverted cone-shaped body 80 and then may be rotated into position, as seen in FIG. 11, to lift the blade disc 32 out of the blade holder 30, shown in FIG. 8.

Figure 12:
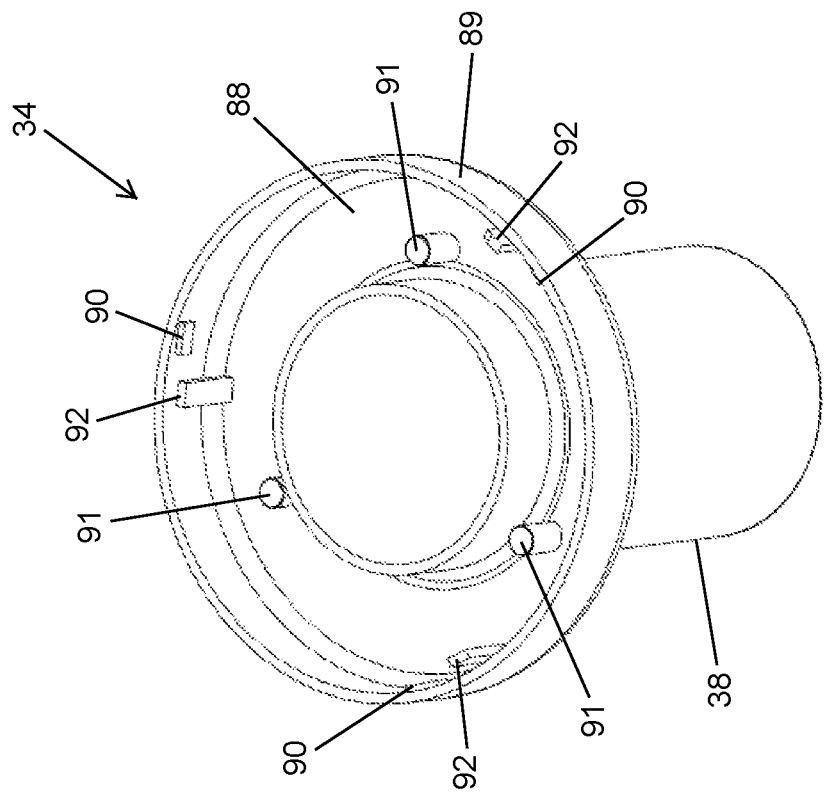
FIG. 12 is a front, bottom, left-hand side perspective view of a lid of the spiralizer attachment of FIG. 1.

Referring to FIG. 12, the lid 34 includes a disc portion 88 and the feeding chute 38 extending through the disc portion 88. The disc portion 88 has a wall 89 extending downward at its periphery, with a plurality of sliding blocks 90 formed on an inner surface thereof. The disc portion 88 also includes a plurality of pins 91 extending downward from the disc portion 88 proximate the feeding chute 38 and one or more activation coupling tabs 92 extending downward from the disc portion 88 proximate the wall 89. The sliding blocks 90 are configured to engage the chutes 46, shown in FIG. 5, formed in the outer surface of the base housing 44, shown in FIG. 5, to facilitate attachment of the lid 34 to the base assembly 28, as shown in FIG. 4. The pins 91 are configured to contact the circular flange 81 of the blade disc 32, shown in FIG. 9, when the lid 34 is secured to the base assembly 28 in the closed position, as shown in FIG. 4, to prevent the blade disc 32, shown in FIG. 4, from lifting during operation of the spiralizer attachment 10, shown in FIG. 1. The activation coupling tabs 92 are configured to engage with the one or more lid coupling slots 69 of the rotational ring 52, shown in FIG. 7, to rotationally couple the rotational ring 52 to the lid 34 as shown in FIG. 4.

Referring back to FIG. 3, the pusher 36 includes an elongated body 93 adapted to be received in the feeding chute 38 of the lid 34. The upper end of the elongated body 93 includes a pushing surface 94, which may be substantially flat and is configured to allow a user to push the elongated body 93 into the feeding chute 38. The lower end of the elongated body 93 includes at least one pointed protrusion 95 adapted to stab into food 39 being pushed into the spiralizer attachment 10 through the feeding chute 38, as shown in FIG. 4, to prevent rotation of the food 39.

Figure 13:
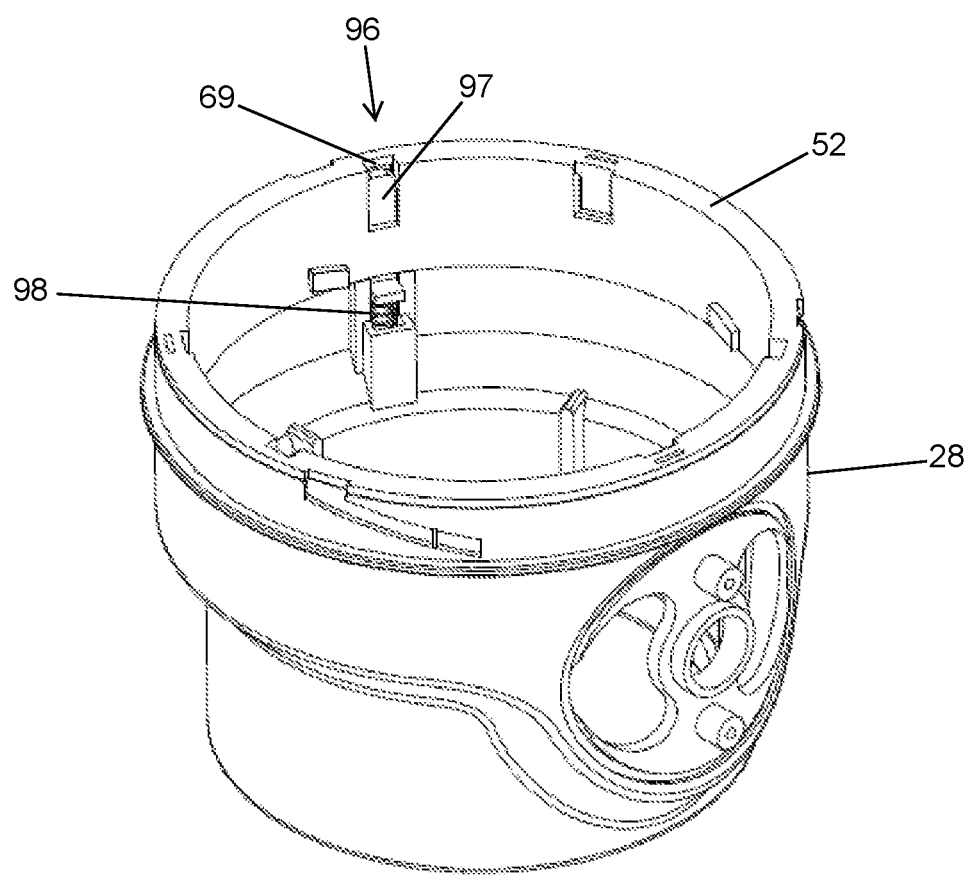
FIG. 13 is a front, top, right-hand side perspective view of a portion of the base assembly of FIG. 5 showing a lock.
Figure 15:
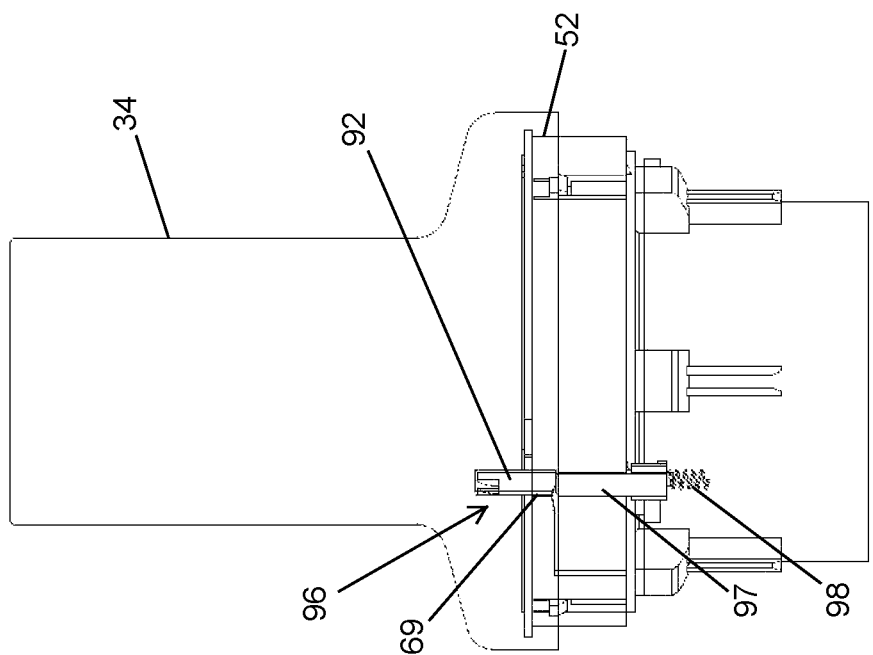
FIG. 15 is a rear view of a portion of the spiralizer attachment of FIG. 1 showing the lock during activation.
Figure 14:
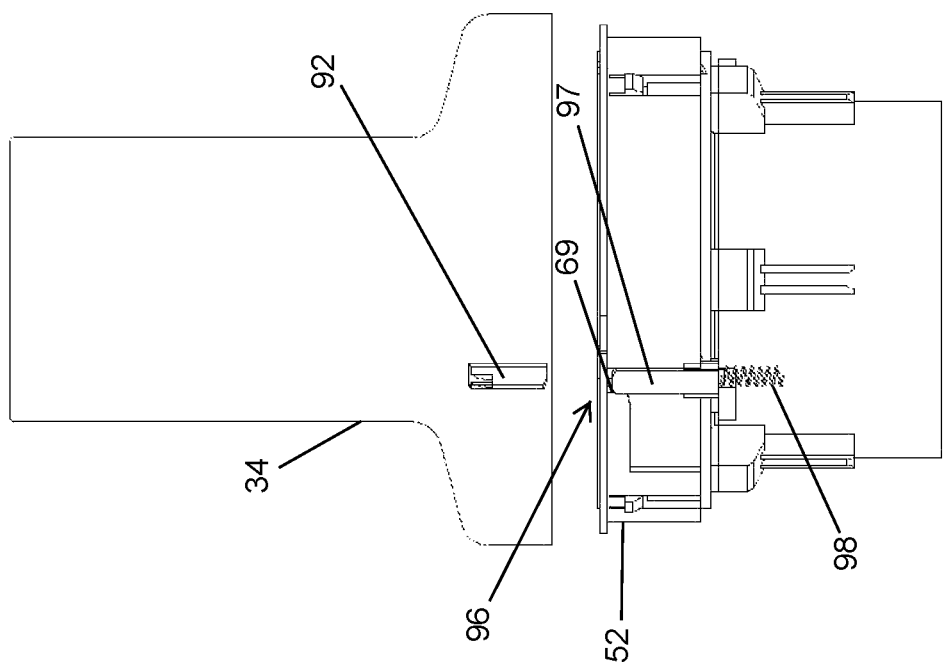
FIG. 14 is a rear view of a portion of the spiralizer attachment of FIG. 1 showing the lock before activation.

Referring to FIGS. 13-15, the spiralizer attachment 10, shown in FIG. 1, may also include a lock 96 that only allows rotation of the rotational ring 52 when the lid 34 is being attached to the base assembly 28. The lock 96 includes a retractable lock bar 97 slidably coupled to the base assembly 28, the lock bar 97 being slidable in the longitudinal direction. The lock 96 further includes a compression spring 98 biasing the lock bar 97 toward the top of the base assembly 28. The lock bar 97 is slidably received in one of the lid coupling slots 69 and rotation of the rotational ring 52 is prevented when the lock bar 97 is disposed within the lid coupling slot 69. As seen in FIGS. 14 and 15, when the lid 34 is secured to the base assembly 28, shown in FIG. 3, the activation coupling tabs 92 slide into the lid coupling slots 69 of the rotational ring 52 and the lock bar 97 is displaced downward by one of the activation coupling tabs 92 to a point where a top surface of the lock bar 97 is even with a bottom surface of the rotational ring 52, thereby allowing the rotational ring 52 to rotate with the lid 34.

Figure 17:
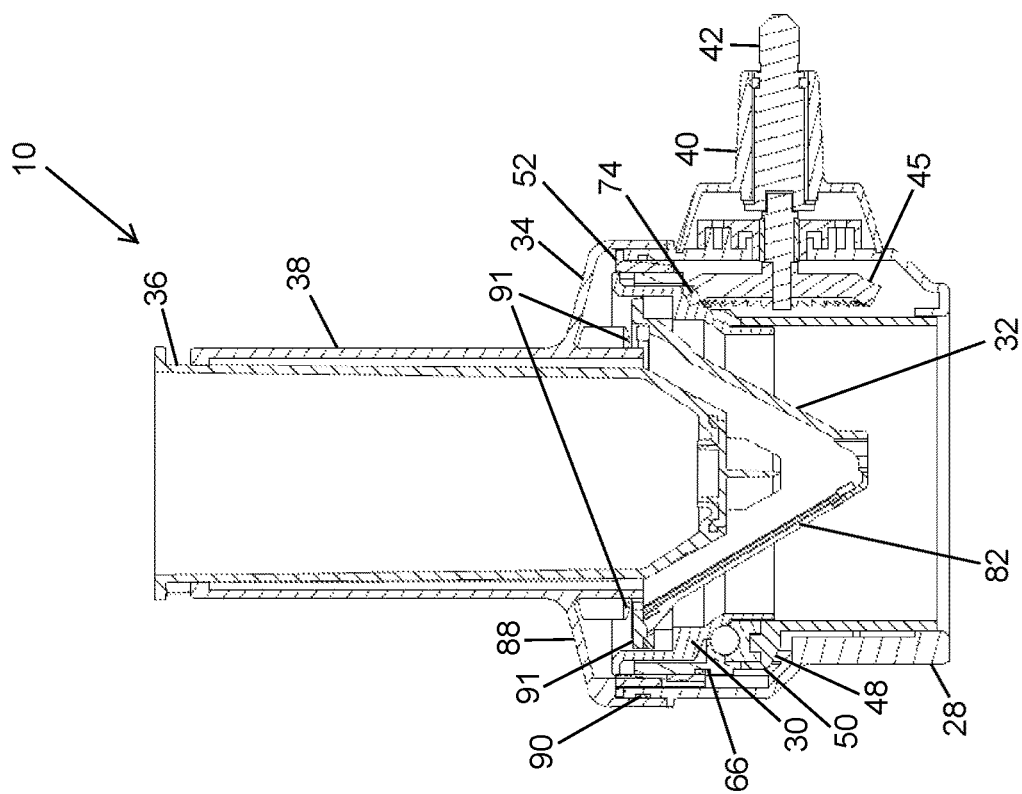
FIG. 17 is a front sectional view of the spiralizer attachment of FIG. 1 with the cover fully engaged.
Figure 16:
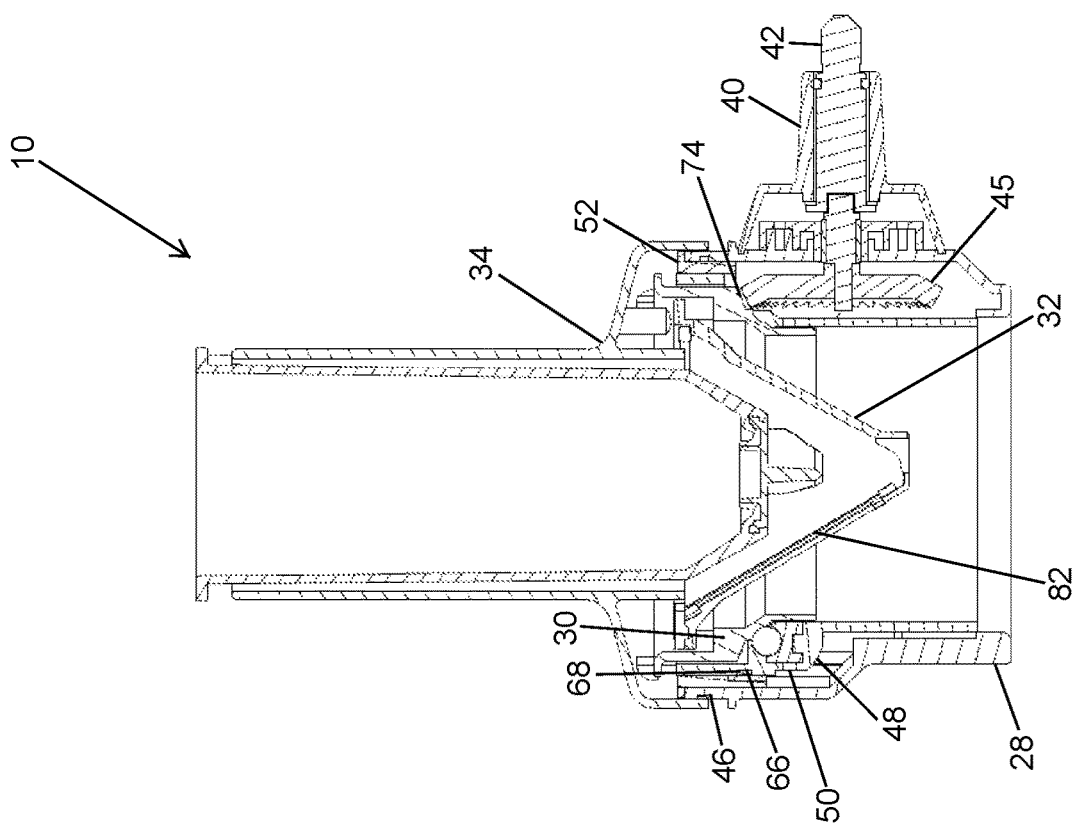
FIG. 16 is a front sectional view of the spiralizer attachment of FIG. 1 without the cover fully engaged.

Referring to FIGS. 16 and 17, in operation, the user of the spiralizer attachment 10 selects blade disc 32 having blade 82 formed to cut food in a desired configuration, as discussed above. The user inserts the blade holder 30 into the activation assembly 48 of the base assembly 28 and inserts the blade disc 32 into the blade disc holder 30. The lid 34 may then be secured to the base assembly 28 by first positioning the lid 34 as seen in FIG. 16, where the sliding blocks 90 on the lid 34, shown in FIG. 12, are aligned with the chutes 46 formed on the base assembly 28 and the activation coupling tabs 92 on the lid 34, shown in FIG. 12, are at least partially inserted into the lid coupling slots 69, shown in FIG. 7, formed in the rotational ring 52. The lid 34 may then be rotated onto the base assembly 28 from the position shown in FIG. 16 to the position shown in FIG. 17 so that the sliding blocks 90 slide into the chutes 46 past the protrusions 47, shown in FIG. 5, thereby moving the lid 34 to the closed position.

As seen in FIG. 16, before the lid 34 has been rotated to the closed position, the activation assembly 48 supports the blade holder 30 in a raised position above the conical gear 45 so that the teeth of the conical gear ring 74 formed in the outer surface of the body of the blade holder 30 are not engaged with the teeth of the conical gear 45. As the lid 34 is rotated from the position shown in FIG. 16 to the closed position shown in FIG. 17, the activation coupling tabs 92 on the lid 34, shown in FIG. 12, which are at least partially inserted in the lid coupling slots 69, shown in FIG. 5, formed in the rotational ring 52, cause the rotational ring 52 to rotate with the lid 34. As the rotational ring 52 rotates, the sliding blocks 68 formed on the rotational ring 52 slide within the chutes 66 formed on the lift assembly 50, causing the lift assembly to lower into the base assembly 28. The blade holder 30, which is being supported by the lift assembly 50, is lowered with the lift assembly 50 to bring the teeth of the conical gear ring 74 into engagement with the teeth of the conical gear 45, as shown in FIG. 17. If the lid 34 is removed from the base assembly 28, the process described above is reversed, such that the blade holder 30 is lifted as the lid 34 is rotated from the position shown in FIG. 17 to the position shown in FIG. 16, thereby bringing the teeth of the conical gear ring 74 out of engagement with the teeth of the conical gear 45, as shown in FIG. 16. Thus, the teeth of the conical gear ring 74 only engage the teeth of the conical gear 45 when the lid 34 is fully secured to the base assembly 28 in the closed position.

The spiralizer attachment 10 is connected to the stand mixer 12, shown in FIG. 1, via the coupling hub 40 to couple the drive shaft 42 to the rotating drive outlet of the attachment drive port 24 of the stand mixer 12, shown in FIG. 1. Thus, actuation of the motor of the stand mixer 12, shown in FIG. 1, causes rotation of the drive shaft 42, which, in turn, causes rotation of the conical gear 45 within the base assembly 28. When the lid 34 is secured to the base assembly 28 as shown in FIG. 17, rotation of the conical gear ring 45 causes rotation of the blade holder 30 within the activation assembly 48 of the base assembly 28. The blade disc 32 rotates with the blade holder 30 due to the rotational coupling provided by the rotational coupling walls 84 of the blade disc 32, shown in FIG. 9, engaging the coupling walls 78 of the blade holder 30, shown in FIG. 8. Thus, the motor of the stand mixer 12, shown in FIG. 1, rotates the blade disc 32 and cutting blade 82 thereof within the spiralizer attachment 10. As seen in FIG. 17, the pins 91 extending downward from the disc portion 88 of the lid 34 are positioned above the circular flange 81 of the blade disc 32 to prevent the blade disc 32 from lifting during rotation. Food may be fed into the spiralizer attachment 10 through the feeding chute 38 using the pusher 36. As the food contacts the cutting blade 82, the cutting blade 82 cuts the food into slices, shavings, julienne style ribbons, and/or other similar cut food portions depending upon the selected configuration of the cutting blade 82. The cut food portions drop through the opening in the bottom of the base assembly 28, where the user may collect the cut food portions in a bowl, dish, or other similar container.

If, for any reason, the lid 34 is removed from the base assembly 28 while the motor of the stand mixer 12, shown in FIG. 1, is still running, rotation of the blade disc 32 is terminated due to the lifting of the blade holder 30 from the conical gear 45 as discussed above and seen in FIG. 16. Thus, for instance, if the user decides to change from one disc blade 32 having a first cutting configuration to another, interchangeable disc blade 32 having a second cutting configuration, the blade disc 32 will stop rotating as the lid 34 is removed, regardless of whether or not the motor is deactivated.

Referring back to FIGS. 3 and 4, the feeding chute 38 of the lid 34 extends vertically upward from the disc portion 88. As seen in FIG. 3, the rotating blade 82 is offset relative to the longitudinal axis of the vertical feeding chute 38. This offset configuration causes the vertical feeding chute 38 to deliver food 39 to the rotating cutting blade 82 such that the cutting blade 82 cuts the food 39 into spirals, or continuous slices or shavings.

Figure 18:
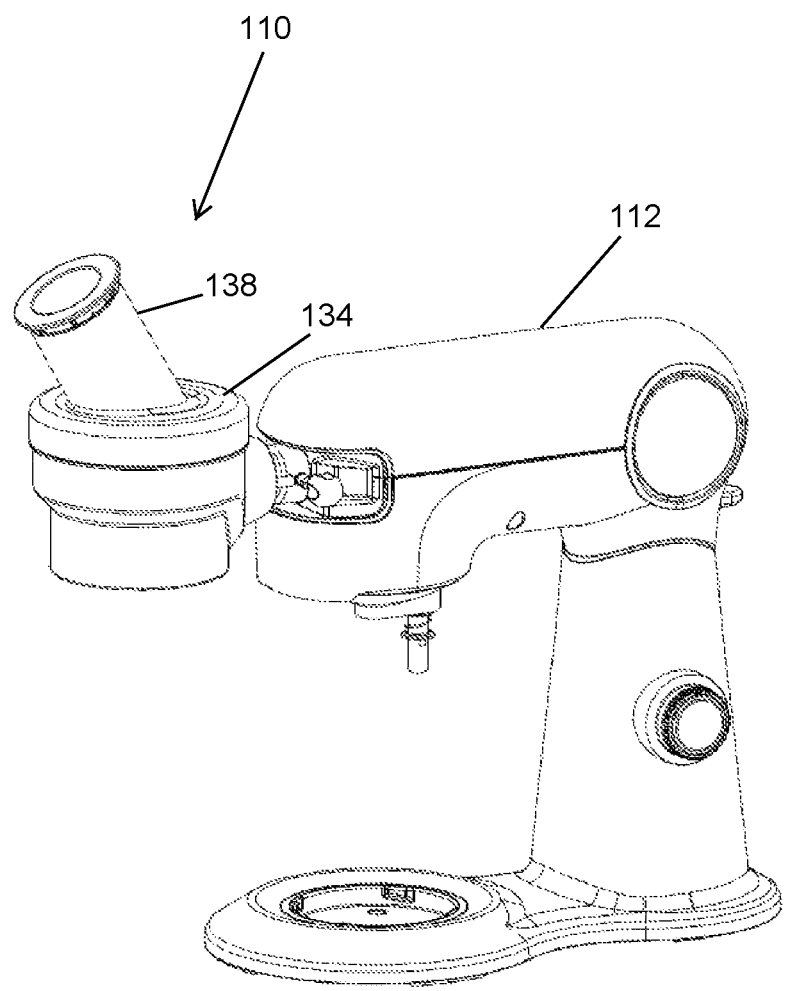
FIG. 18 is a front, top, left-hand side perspective view of a spiralizer attachment and stand mixer according to the present disclosure.

Referring to FIG. 18, wherein like numerals represent like elements, a spiralizer attachment 110 is shown having a lid 134 with a feeding chute 138 that is tilted at an angle relative to the vertical direction. The spiralizer attachment 110 connects to a countertop stand mixer 112 in the same manner discussed in connection with the spiralizer attachment 10, shown in FIG. 1.

Figure 19:
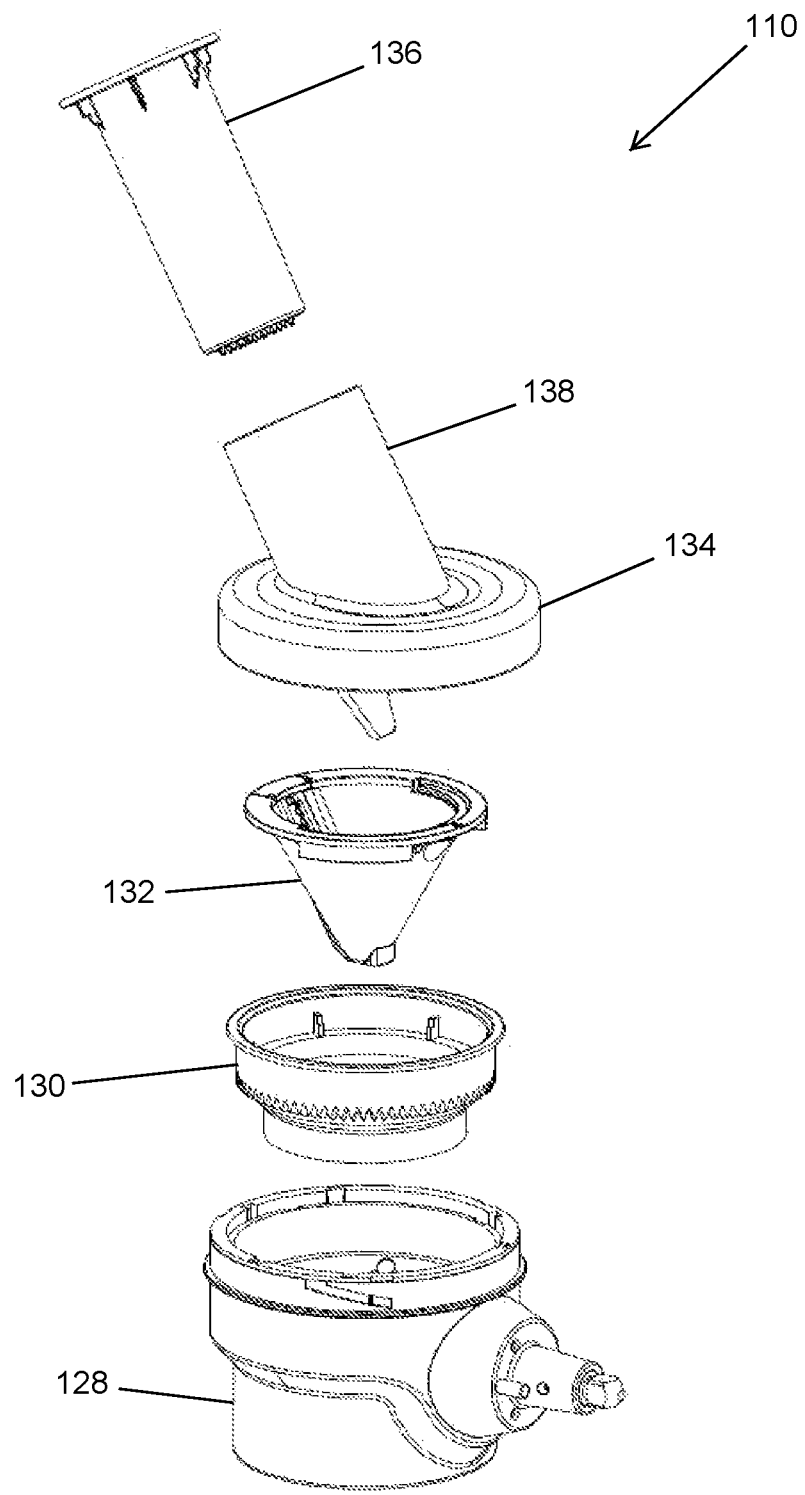
FIG. 19 is an exploded front, top, right-hand side perspective view of the spiralizer attachment of FIG. 18.

Referring to FIG. 19, the spiralizer attachment 110 includes the lid 134, a base assembly 128, blade holder 130, blade disc 132, and a pusher 136. The base assembly 128, blade holder 130, and blade disc 132 are substantially identical in form and function to the base assembly 28, blade holder 30, and blade disc 32 described above in connection with FIGS. 1-17 and, therefore, the base assembly 128, blade holder 130, and blade disc 132 will not be described in detail. The pusher 136 is also substantially identical to the pusher 36, shown in FIG. 3, except that the pusher 136 includes a plurality of smaller protrusions 195 rather than the single larger at least one protrusion 95 of the pusher 36, shown in FIG. 3. Like the at least one protrusion 95, shown in FIG. 3, the plurality of smaller protrusions 195 are adapted to stab into food 139, shown in FIG. 21, being pushed into the spiralizer attachment 110 through the feeding chute 138, as shown in FIG. 21, to prevent rotation of the food 139.

Figure 20:
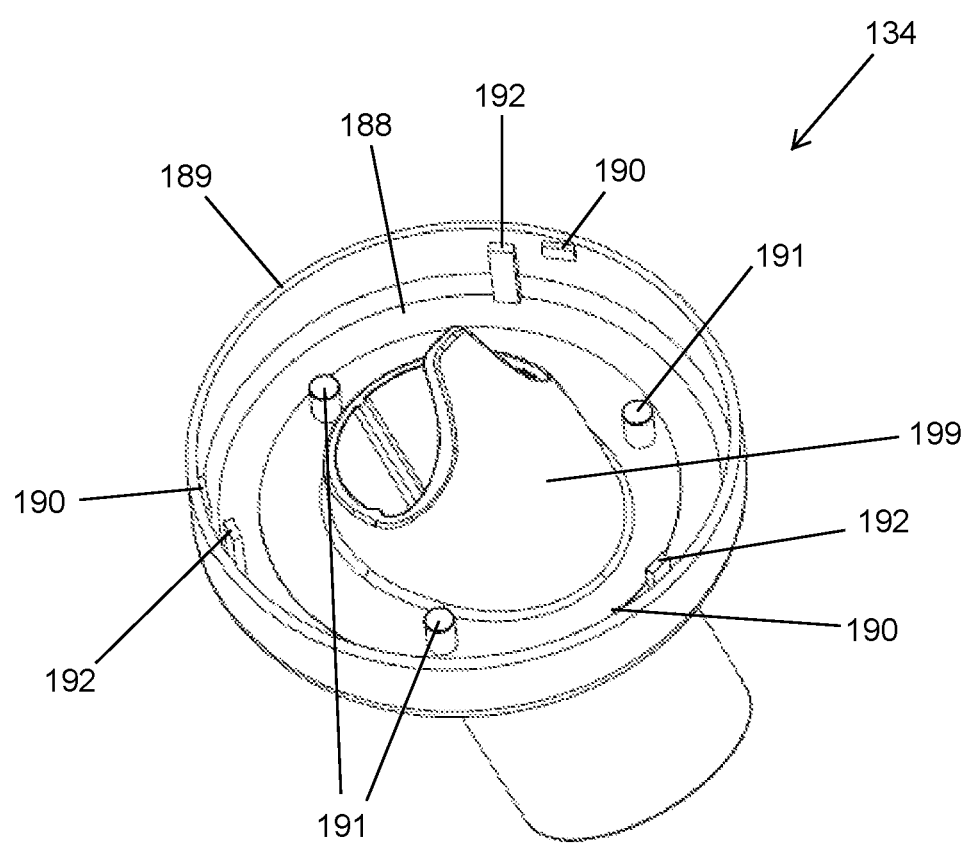
FIG. 20 is a front, bottom, left-hand side perspective view of a lid of the spiralizer attachment of FIG. 18.

Referring to FIG. 20, the lid 134 includes a disc portion 188 having the feeding chute 138 extending therethrough and upward at a tilted angle relative to the vertical direction. The feeding chute 138 may also include a food support extension 199 extending downward from the disc portion 188 at the tilted angle. The disc portion 188 further includes a wall 189 extending downward at its periphery, with a plurality of sliding blocks 190 formed on an inner surface thereof. The disc portion 188 also includes a plurality of pins 191 extending downward from the disc portion 188 proximate the feeding chute 138 and one or more activation coupling tabs 192 extending downward from the disc portion 188 proximate the wall 189. The disc portion 188, wall 189, sliding blocks 190, pins 191 and activation coupling tabs 192 are substantially identical in form and function to the disc portion 88, wall 89, sliding blocks 90, pins 91 and activation coupling tabs 92 described in connection with FIGS. 1-17 and, therefore, the disc portion 188, wall 189, sliding blocks 190, pins 191 and activation coupling tabs 192 and their interactions with the base assembly 128, blade holder 130, and blade disc 132, shown in FIG. 19, will not be described in detail.

Figure 21:
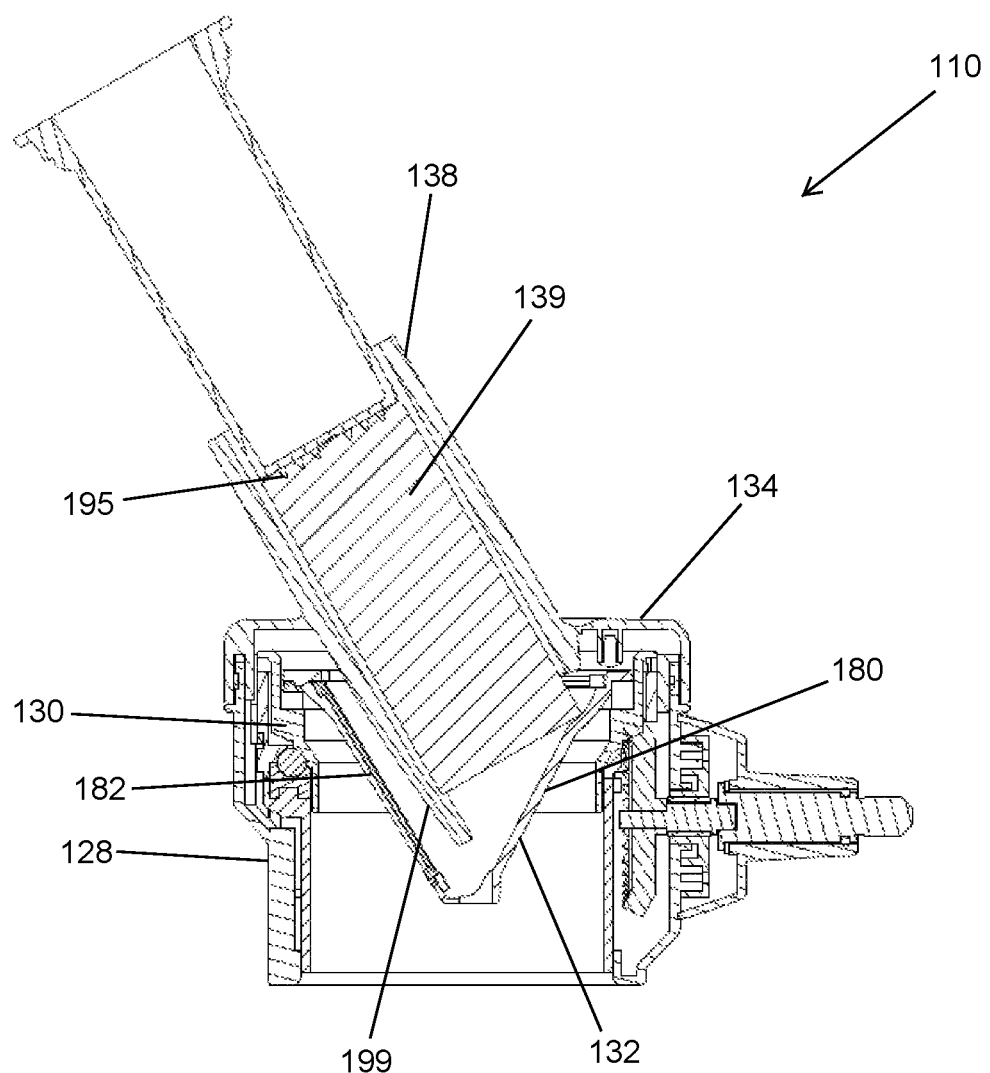
FIG. 21 is a front sectional view of the spiralizer attachment of FIG. 18.

Referring to FIG. 21, a longitudinal axis of the tilted-angle feeding chute 138 is oriented to be approximately perpendicular to a wall of inverted cone-shaped body 180 of disc blade 132. This causes the tilted-angle feeding chute 138 to deliver food 139 into the spiralizer attachment 110 so that a rotating cutting blade 182 is approximately perpendicular to the food 139 as the blade 182 cuts the food. This configuration causes the cutting blade 182 to cut food portions in the form of clean slices, rather than a continuous ribbon. The food support extension 199 provides support for the food 139 within the spiralizer attachment 110 as the food 139 is fed to the cutting blade 182. The food support extension 199 is sized and shaped so that, when the lid 134 is coupled to the base assembly 128, blade holder 130 and blade disc 132 in the manner described above, the blade disc 132 does not contact the food support extension 199 during rotation.

The spiralizer attachment 10, 110 according to the present disclosure advantageously provide an attachment for a stand mixer that is able to cut food, such as raw vegetables, fruits, and the like, in a variety of styles, such as slices, shavings, julienne style ribbons, and/or other similar cut food portions. The spiralizer attachment 10, 110 does so by allowing for the easy insertion and removal of interchangeable blade discs 32, 132, which may have different cutting blades 82, 182 designed for different styles of cuts. Additionally, the different feeding chutes 38, 138 may also be interchanged to alter the manner in which the food is fed to the cutting blades 82, 182 to aid in cutting the food in the variety of different styles discussed above.

The spiralizer attachment 10, 110 according to the present disclosure also advantageously provides for safe operation and use by only engaging and rotating the blade disc 32, 132 with the drive shaft 42 when the lid 34, 134 is in the fully closed position and by disengaging the cutting blade 82, 182 when the lid 34, 134 is removed from the base assembly 28, 128.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure. For example, although the spiralizer attachment of the present disclosure has been described as being driven by a stand mixer for simplicity, it should be understood by those skilled in the art that the spiralizer attachment described herein could be powered by any other similar kitchen machine having a drive output similar to the accessory drive port of the stand mixer.

What is claimed is:

1. A spiralizer attachment for a stand mixer comprising:
   a base assembly connectable to an attachment drive port of the stand mixer;
   a cutting blade rotatably disposed in the base assembly;
   a lid including a feeding chute through which food can be delivered to the cutting blade;
   a drive system adapted to drive the cutting blade in rotary motion within the base assembly; and
   an actuation assembly configured to connect and disconnect the cutting blade from the drive system when the lid is attached to and detached from the base assembly, respectively.

2. The spiralizer attachment according to claim 1, wherein the feeding chute extends vertically outward from a disc portion of the lid.

3. The spiralizer attachment according to claim 1, wherein the feeding chute extends outwardly from a disc portion of the lid at a tilted angle.

4. The spiralizer attachment according to claim 3, wherein the cutting blade is provided on a blade disc having an inverted cone-shaped body.

5. The spiralizer attachment according to claim 4, wherein the feeding chute extends outwardly from the disc portion of the lid at an acute angle relative to a rotational axis about which the cutting blade rotates.

6. The spiralizer attachment according to claim 1, wherein the drive system comprises:
   a drive shaft connectable to the attachment drive port of the stand mixer;
   a first gear coupled to the drive shaft; and
   a blade holder supporting the cutting blade and rotationally coupled to the cutting blade, the blade holder comprising a ring gear formed in an outer surface of the blade holder;
   wherein the actuation assembly brings the ring gear into and out of contact with the first gear coupled to the drive shaft.

7. The spiralizer attachment according to claim 6, wherein the first gear is a conical gear; and
   wherein the ring gear formed in the outer surface of the blade holder is a conical gear ring.

8. The spiralizer attachment according to claim 6, wherein the lid comprises a plurality of sliding blocks receivable in corresponding chutes formed in the base assembly to couple the lid to the base assembly; and
   at least one activation coupling tab adapted to engage the actuation assembly and cause actuation of the actuation assembly when the lid is coupled and decoupled from the base assembly.

9. The spiralizer attachment according to claim 8, wherein the actuation assembly comprises:
   a lift assembly slidably disposed within the base assembly; and
   a rotational ring, the rotational ring slidably coupled to an upper end of the lift assembly such that rotation of the rotational ring causes lifting or lowering of the lift assembly within the base assembly;
   wherein the rotational ring comprises at least one lid coupling slot, each lid coupling slot of the at least one lid coupling slot configured to receive an activation coupling tab of the at least one activation coupling tab of the lid.

10. The spiralizer attachment according to claim 9, wherein the lift assembly includes an anti-rotation feature engaging a corresponding feature on the base assembly and preventing rotation of the lift assembly relative to the base assembly.

11. The spiralizer attachment according to claim 9, wherein the lift assembly includes a shelf supporting the blade holder on the lift assembly.

12. The spiralizer attachment according to claim 11, wherein rotation of the lid relative to the base assembly drives rotation of the rotational ring and lifting or lowering of the lift assembly and the blade holder to bring the ring gear into and out of contact with the first gear coupled to the drive shaft.

13. The spiralizer attachment according to claim 9, wherein the base assembly comprises a lock that only allows rotation of the rotation ring when each activation coupling tab of the at least one activation coupling tab of the lid is received in a respective lid coupling slot of the at least one lid coupling slot.

14. The spiralizer attachment according to claim 13, wherein the lock comprises a lock bar biased into one of the at least one lid coupling slot and displaceable from the one of the at least one lid coupling slot by an activation coupling tab of the at least one activation coupling tab.

\* \* \* \* \*